United States Patent [19]

Dries et al.

[11] Patent Number: 5,693,113
[45] Date of Patent: Dec. 2, 1997

[54] CONTAINER GRIPPER APPARATUS

[75] Inventors: Hugo Dries, Mount Macedon, Australia; Thorsten Seidel, Wuppertal, Germany

[73] Assignee: International Partners In Glass Research, Clayton North, Australia

[21] Appl. No.: 481,496

[22] PCT Filed: Jan. 25, 1994

[86] PCT No.: PCT/AU94/00029

§ 371 Date: Jul. 10, 1995

§ 102(e) Date: Jul. 10, 1995

[87] PCT Pub. No.: WO94/17002

PCT Pub. Date: Aug. 4, 1994

[30] Foreign Application Priority Data

Jan. 25, 1993 [AU] Australia ................ PL6923

[51] Int. Cl.$^6$ .................. C03B 9/04; C03B 9/44; C03B 11/00; C03B 13/00
[52] U.S. Cl. .................. 65/260; 65/239; 65/241; 294/115; 294/116
[58] Field of Search ............ 65/260, 239, 241; 294/116, 114

[56] References Cited

U.S. PATENT DOCUMENTS

| | | | |
|---|---|---|---|
| 3,451,711 | 6/1969 | Carpenter | 294/113 |
| 3,951,285 | 4/1976 | Barker | 214/309 |
| 3,981,673 | 9/1976 | Sokolow | 425/455 |
| 4,169,621 | 10/1979 | McGill | 294/116 |
| 4,351,663 | 9/1982 | Wood . | |
| 4,368,913 | 1/1983 | Brockmann et al. | 294/106 |
| 4,529,432 | 7/1985 | Nebelung et al. | 65/260 |
| 4,530,711 | 7/1985 | Nebelung et al. | 65/260 |
| 4,636,241 | 1/1987 | Nebelung | 65/260 |
| 5,211,992 | 5/1993 | Newton et al. . | |

FOREIGN PATENT DOCUMENTS

| | | |
|---|---|---|
| 62/210040 | 8/1988 | Japan . |
| 646 723 | 11/1950 | United Kingdom . |
| 647 509 | 12/1950 | United Kingdom . |
| 955 715 | 4/1964 | United Kingdom . |
| 1 007 515 | 10/1965 | United Kingdom . |

*Primary Examiner*—Donald E. Czaja
*Assistant Examiner*—Jacqueline A. Ruller
*Attorney, Agent, or Firm*—Burns, Doane, Swecker & Mathis, L.L.P.

[57] ABSTRACT

Gripper apparatus for gripping a row of glass containers moving on a lehr conveyor. The apparatus includes a pair of elongated gripping members arranged parallel with one another and relatively movable toward one another to grip a row of glass containers. Actuating means is connected to the gripping members for controlling their relative movement and thus gripping and releasing of the containers. The actuating means may include a series of actuating devices spaced apart along and connected to the gripping members. Those actuating devices are actuable, at least substantially following movement of the gripping members to grip containers on the lehr conveyor, to move the gripping members in a direction away from the lehr conveyor so as to move the depending gripped containers clear of the conveyor. The actuating devices are also actuable, at least substantially before movement of the gripping members to release the containers onto the lehr conveyor, to move the gripping members in a direction toward the lehr conveyor so as to place the containers onto the conveyor.

30 Claims, 8 Drawing Sheets

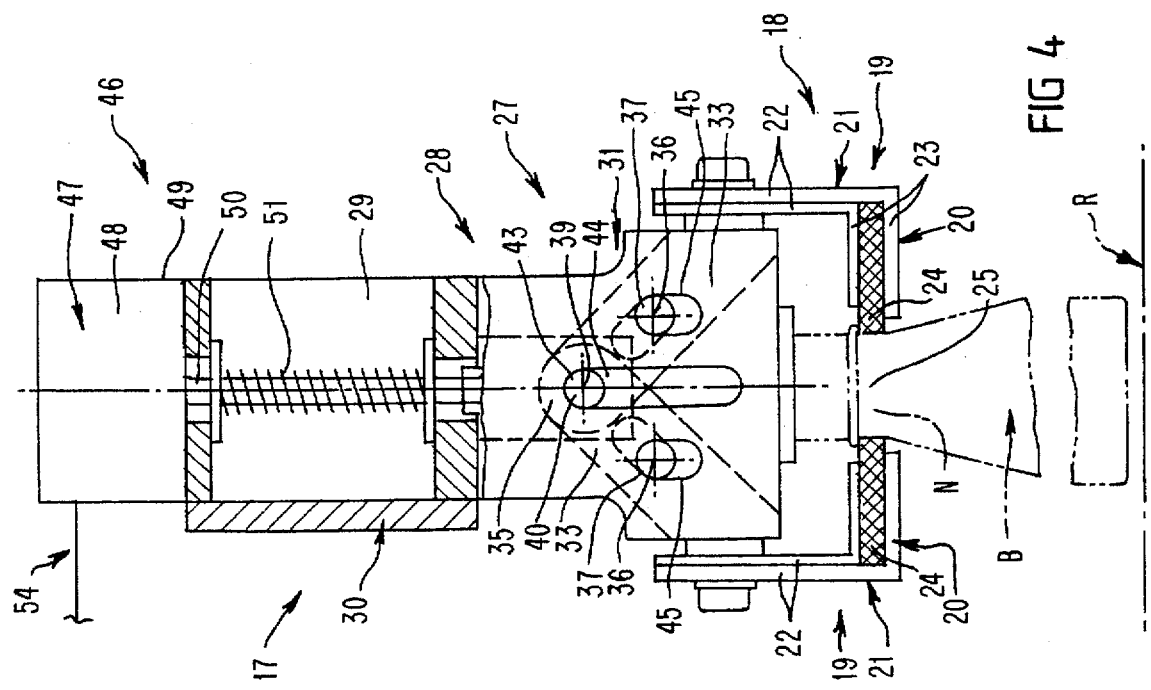
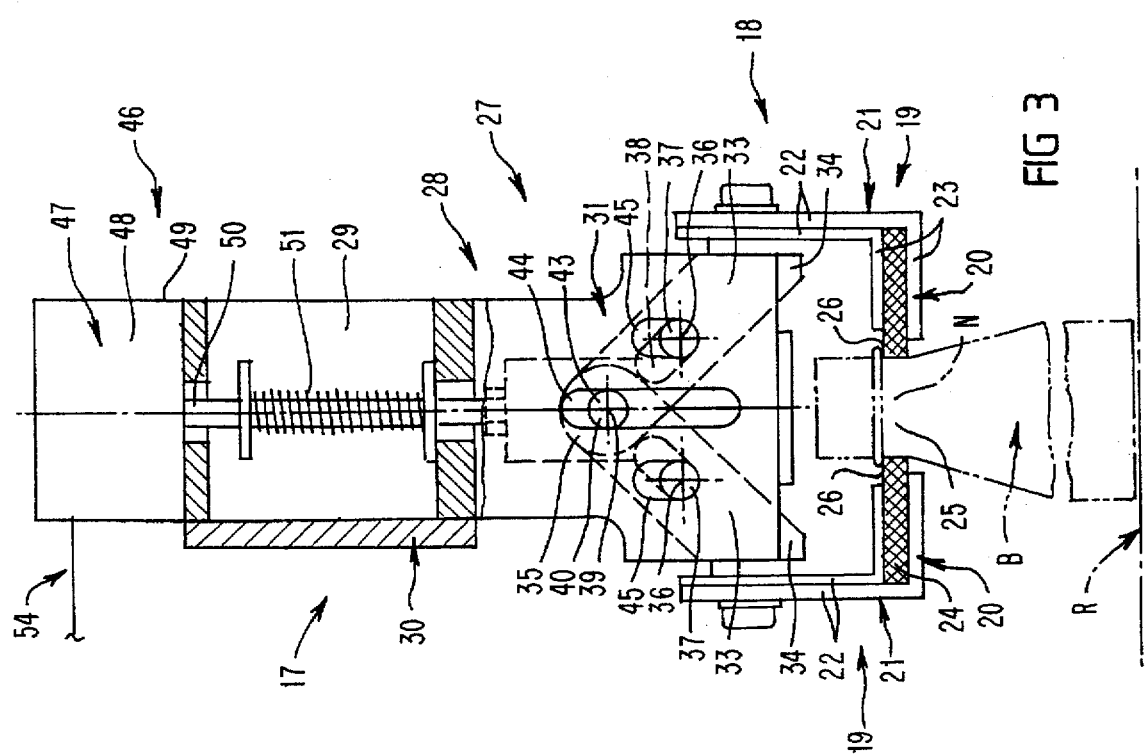

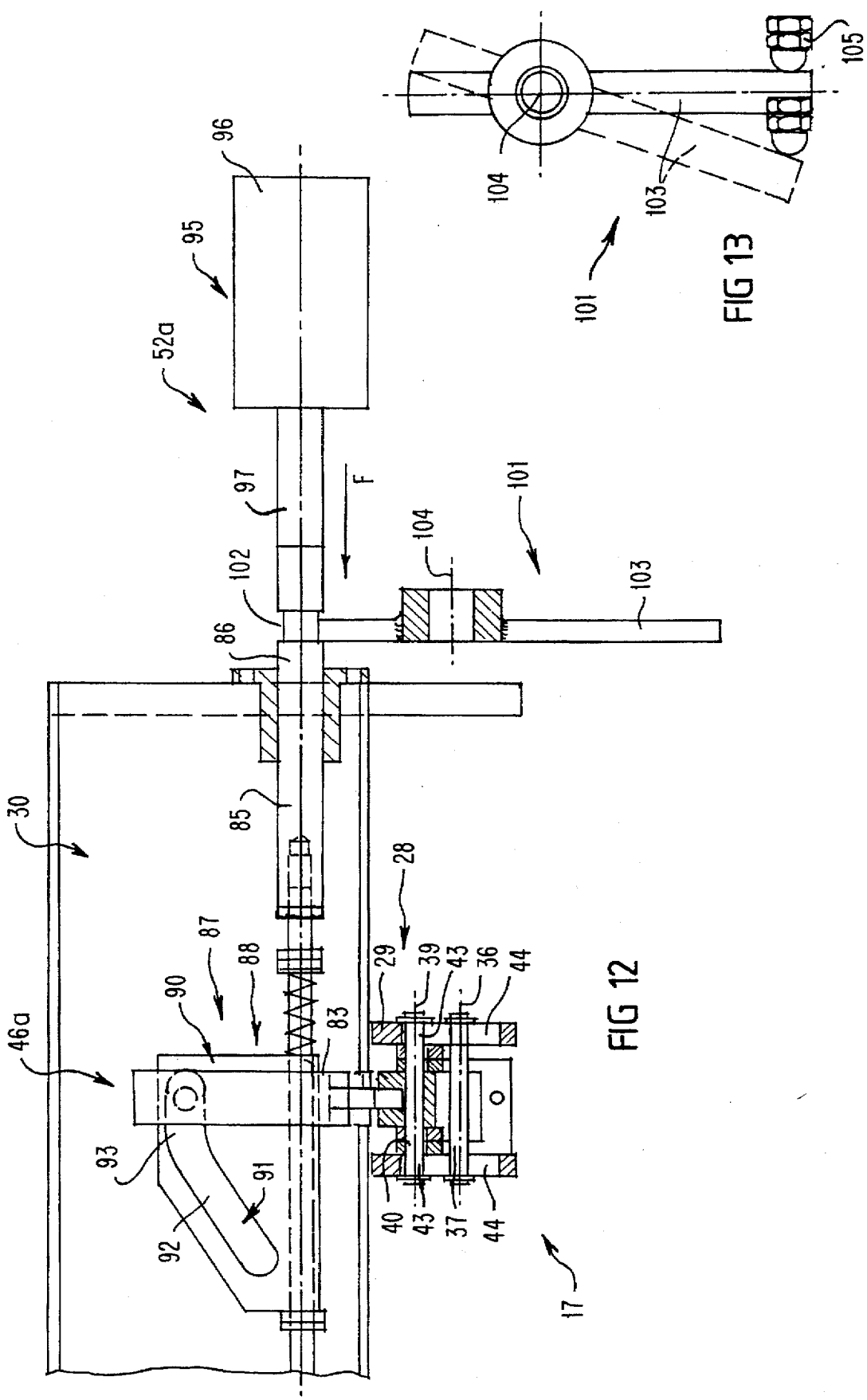

CONTAINER GRIPPER APPARATUS

BACKGROUND OF THE INVENTION

This invention relates generally to controlled handling of articles during article processing, including article gripping for processing and release following processing. In particular, the invention concerns a gripper apparatus for selective gripping of a row of fragile articles for their pick up from a moving surface, and subsequent release to return those articles to the moving surface. The invention is applicable to gripping and release of rows of glass containers, such as bottles, moving on a conveyor, such as a lehr conveyor, and it will be convenient to hereinafter describe the invention in relation to that exemplary application. It is to be appreciated, however, that the invention is not limited to that application.

Australian patent 631966 and international (PCT) patent application PCT/AU92/00627 disclose methods and apparatus for dip coating the exterior surface of glass bottles in order to increase their resistance and impact strengths. The methods and apparatus are applied to moving rows of heated glass bottles exiting continuously from a lehr on a lehr conveyer. In general terms, each row of moving bottles is in turn gripped and picked up from the conveyer, and held in upright stable suspension for dipping into a bath of coated material so as to apply a thin coating of material to each bottle exterior surface. Following dipping, the coating is at least partially cured, and the bottles are eventually returned to the moving lehr conveyer and released for conventional downstream processing.

The prior apparatus has pick up mechanisms for releasably gripping successive rows of bottles at an upper region thereof and picking them up from the lehr conveyor for moving them along a conveying path during dipping and curing. The pick up mechanisms subsequently reposition the coated bottles back on the lehr conveyer, and release their grip so that the bottles are returned to the conveyer.

Typically, glass bottles are carried on lehr conveyers in closely spaced apart lateral rows each having up to 48 bottles, and travel at speeds of up to about 600 bottles per minute. Production efficiency requirements at bottle manufacturing plants dictate that this bottle volume and rate be maintained, so that the introduction into bottle processing of any additional processing step, such as dip coating, necessitates that it be achieved without any significant affect on the overall bottle processing. Accordingly, the dip coating apparatus has been required to pick up the moving bottle rows from the lehr conveyor, coat the bottles and then return the coated bottles to the conveyor without disturbing movement of bottles either out of the lehr or downstream of the coating procedure.

A difficulty with the prior dip coating apparatus has been consistency in orderly bottle pick up from and return to the lehr conveyor. While the pick up mechanisms of the prior apparatus are able to achieve gripping and release of wide bottle rows, that has not occured with acceptable consistency. In particular, it has been found that sometimes not all bottles in a row are gripped for pick up by the pick up mechanisms, while at other times a complete row is not gripped or picked up. Moreover, sometimes bottles that are initially gripped and picked up are held incorrectly so that they inadvertantly drop from the pick up mechanisms back on to the conveyor and break. This makes stable quality control very difficult to maintain. Further, where the bottles are not properly picked up or put down, they may be knocked over on the lehr conveyor by a passing pick up mechanism, starting a chain reaction of bottle fall along the lehr conveyor creating havoc in the production line.

OBJECTS AND SUMMARY OF THE INVENTION

It is an object of the present invention to alleviate this difficulty through the provision of an improved article gripper apparatus.

It is another object of the present invention to provide a gripper apparatus which can be reliably operated to consistently grip moving fragile articles, such as bottles, for pick up and processing and then release those articles for put down following processing.

A further object of the present invention is to provide a gripper apparatus, particularly suitable for gripping rows of glass bottles moving on a conveyor for picking up those bottles from the conveyor for processing and subsequently releasing those bottles for return to the moving conveyor.

With these objects in mind, the present invention broadly provides gripper apparatus for releasably gripping a row of glass containers moving on a lehr conveyor, including: a pair of elongate gripping members arranged parallel with one another and relatively movable toward one another to grip a row of glass containers at an upper region thereof so that the glass containers depend from the gripping members in spaced relation therealong, and relatively movable away from one another to release the row of gripped containers; actuating means including a series of actuating devices spaced apart along and connected to the gripping members, and actuable to control relative movement of the gripping members and thus gripping and release of the containers; and drive means operatively connected to the actuating devices, the drive means including an elongate drive member mounted for longitudinal linear movement, and a series of cooperable cam and follower members spaced apart along the drive member, each cam member and follower member being associated with the drive member and a respective actuating device, the cam and follower members cooperating with one another so that linear movement of the drive member in alternate linear directions causes the actuating devices to move the gripping members for respective container gripping and release.

Preferably, the drive means further includes a respective connecting member connected to each actuating device. The cam and follower members preferably interconnect the drive member and respective connecting members so that linear movement of the drive member drives the connecting members to actuate the actuating devices.

Preferably, the cam members are rigidly mounted along the drive member for movement therewith, and the follower members are mounted on each of the connecting members.

In one embodiment, the drive member includes a drive rod and each cam member includes a cam plate having an elongate cam slot. Each follower member in this embodiment includes a follower pin received in the cam slot, movement of the drive rod causing the follower pins to move along the respective cam slots in response to cam plate movement.

Preferably, the drive means includes biasing means acting to bias the gripping members into a container release position. The drive means is preferably selectively operable to linearly move the drive member in one linear direction thereby to move the gripping members against the bias of the biasing means into a container gripping position.

The drive means includes a drive motor which operably engages to linearly move the drive member in one embodiment. In one embodiment the drive motor is operable to move the drive member in the one linear direction and the biasing means includes a resilient biasing member acting on the drive member to bias the drive member in an opposite linear direction. The drive motor is selectively operable to move the drive member in the one direction against the resilient bias to move the gripping members into the container gripping position. With this preferred arrangement, in the event of operational failure of the drive motor, the biasing member will act to maintain the gripping members in their release position so that containers will not be gripped or picked up. Thus, in the application of the gripper apparatus to picking up rows of glass containers from a lehr conveyor, the opened gripping members will pass by clear of the container row rather than knock them over or attempt to pick them up with a malfunctioning drive motor.

Preferably, the actuating devices are arranged to move the gripping members in arcuate directions toward and away from one another for container grip and release. Each gripping member preferably moves through an arcuate distance of about 90° between container gripped and released positions.

Preferably, each actuating device includes a rigid device body through which the actuating devices are all rigidly mounted to a common elongate mounting bar. Each actuating device preferably also includes a mounting linkage carried by the device body and connected to the gripping members. The mounting linkage has a pair of mounting links connected one each to a respective gripping member and connected to the device body for movement relative thereto. The drive means is connected to the mounting linkages to move the links thereby causing movement of the respective gripping members for container gripping and release.

In at least one embodiment, each mounting link has opposed end regions. One end region of each link is rigidly connected to a respective gripping member. Moreover, the links are separately pivotably connected to the device body intermediate the end regions thereof and permitting pivotal movement of the links about parallel, spaced apart separate pivot axes thereby causing arcuate movement of the gripping members.

In at least one embodiment, the other end regions of each mounting link pair are pivotably interconnected so as to pivot together about a common pivot axis located generally centrally between the separate pivot axes. Each mounting linkage may include a common pivot shaft on which the other end regions of the mounting links are journalled.

Preferably, the mounting links are linearly movable relative to the device body to allow linear movement of the gripping members toward and away from the lehr conveyor. In this arrangement, the drive means is operable immediately following gripping of a row of containers supported on a lehr conveyor to raise the mounting links and gripping members in order to lift the depending containers clear of the lehr conveyor and, immediately prior to release of the gripped containers on to the lehr conveyor to lower the mounting links and gripping members in order to place the containers on to the conveyor.

Preferably, the connecting members are connected to respective mounting linkages so that driving of the connecting members moves the mounting links.

In at least one embodiment, each connecting member includes a connecting rod connected to each common pivot shaft and drivable in linear directions toward and away from the lehr conveyor. With this arrangement, movement of the connecting rods in a direction toward the lehr conveyor causes downward linear movement, followed by upward arcuate movement, of the mounting links and gripping members to move the gripping members to a container released position. In addition, movement in a direction away from the lehr conveyor causes downward arcuate movement, followed by upward linear movement, of the mounting links and gripping members to move the gripping members to a container gripped position.

BRIEF DESCRIPTION OF THE DRAWINGS

The following description refers to a container coating apparatus incorporating a preferred embodiment of the gripper apparatus of the present invention. To facilitate an understanding of the invention, reference is made in the description to the accompanying drawings where the apparatus is illustrated in the preferred embodiment. It is to be understood that the gripper apparatus is not limited to the preferred embodiments as hereinafter described and as illustrated in the drawings.

In the drawings:

FIG. 3 is a similar view as FIG. 2 of the gripper mechanism but showing the gripping members moved into their gripping position;

FIG. 4 is a similar view as FIGS. 2 and 3 of the gripper mechanism but showing the gripping members moved into their gripped position;

FIG. 12 is a similar view as FIG. 9 of the gripper mechanism but showing the gripping members in their gripped positions; and, FIG. 13 is a front view of part of the drive means as shown in FIGS. 9 and 12.

DETAILED DESCRIPTION OF A PREFERRED EMBODIMENT OF THE INVENTION

Figure 1:
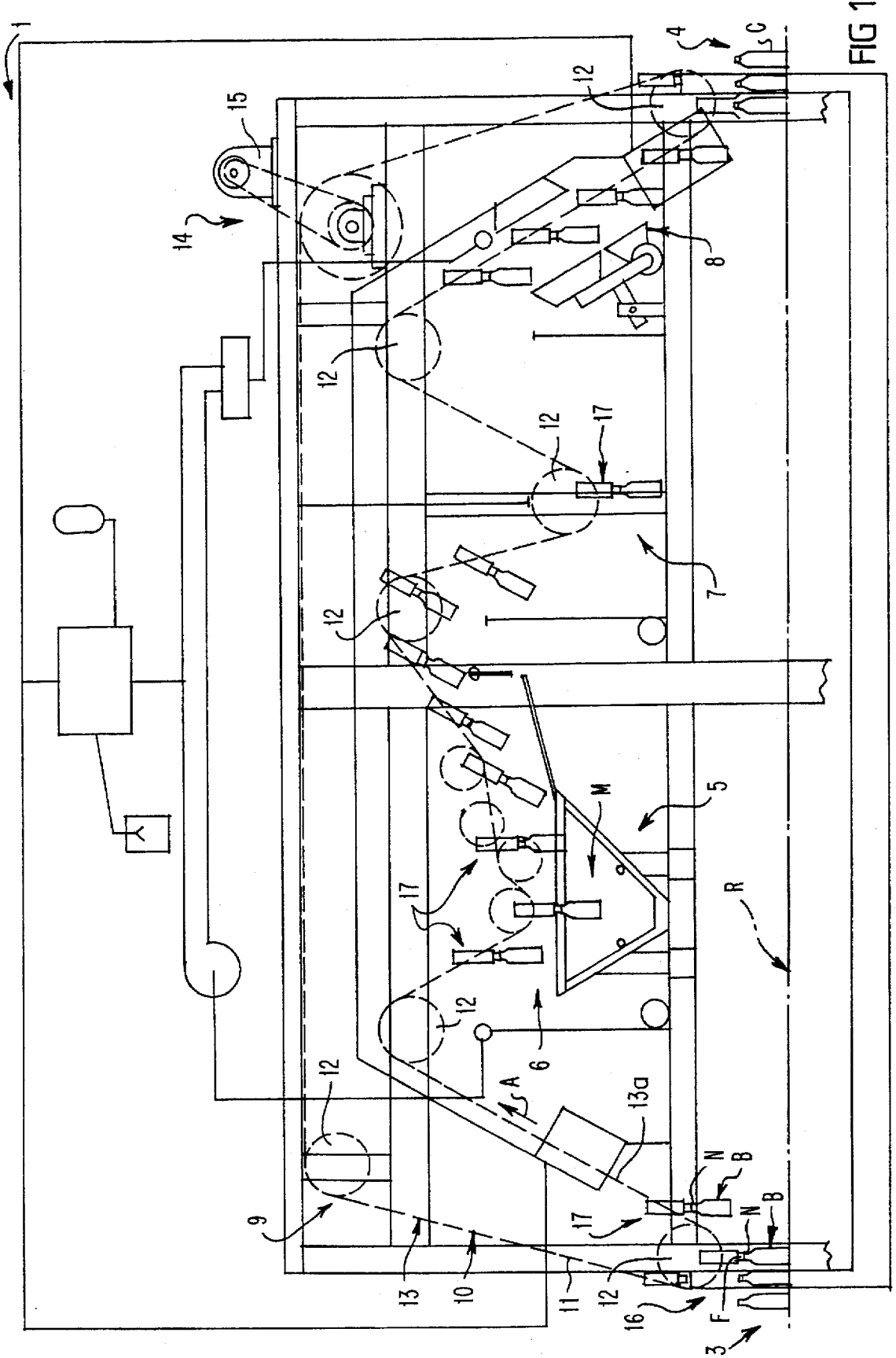
FIG. 1 is a general side view of an examplary coating apparatus incorporating gripper apparatus according to a preferred embodiment of the present invention.

Referring initially to FIG. 1 of the drawings, there is generally shown coating apparatus 1 for dip coating cylindrical bottles B in a bath of liquid coating material M so as to apply a coating C to the outer surface thereof. The apparatus 1 is disclosed in detail in the above mentioned Australian patent and International patent application, which disclosures are now incorporated herein by reference. Detailed description of the apparatus 1 will not be repeated herein, although a brief outline will be provided to facilitate a better understanding of the present invention as incorporated into the apparatus 1.

Briefly, in the apparatus 1, the bottles B are conveyed continuously along a coating path 2 in the direction of arrow A from an apparatus entry zone 3 to an exit zone 4 spaced apart along a lehr conveyor R. The bottles B are conveyed in a line formation composed of individual bottles B arranged one behind the other (not shown), or (as shown) lateral rows of bottles B arranged one behind the other to form the line. Rows of up to about forty-eight (48) bottles B are envisaged depending on the capacity of the bottle manufacturing line.

Conveyance of the bottles B along the coating path 2 includes collecting the bottles B at the entry zone 3 and depositing them at the exit zone 4. Collecting the bottles B includes picking them up from the lehr conveyor R, whilst depositing the bottles B includes putting them back down on the conveyor R. During conveyance along the coating path 2, the bottles B pass successively through an enclosed and sealed (from the surrounding air atmosphere) coating chamber 5 comprising a dipping zone 6 in which the bottles B are dip coated with the coating material M, a thermal ageing zone 7 in which the coating on the bottles B is thermally aged, and a curing zone 8, in which the coating on the bottles B is cured.

To achieve this conveyance, the apparatus 1 includes conveying means 9 having a conveying mechanism 10. That mechanism 10 includes an endless conveying member 11 mounted on support members 12 and movable continuously along a conveying path 13, a section 13a of which extends along the coating path 2 through the coating chamber 5.

The conveying mechanism 10 also includes a drive unit 14 for moving the conveying member 11 along the conveying path 13. That drive unit 14 includes a drive motor 15, such as an electric drive motor, coupled to the conveying member 11 either directly (not shown) or through a suitable belt and pulley or chain and sprocket drive transmission (as shown).

The conveying means 9 also includes gripper apparatus 16 having a series of bottle gripper mechanisms 17 spaced apart and connected to the conveying member 11 for movement therewith. The mechanisms 17 operate in turn to releasably grip and pick up successive rows of bottles B from the conveyor R at the entry zone 3, carry them along the coating path 2, through the coating chamber 5 and in particular the dipping zone 6, thermal ageing zone 7 and curing zone 8, to replace the coated bottles B on the conveyor R toward the exit zone 4 and release the bottles B. Each gripper mechanism 17 holds the bottles B at an upper neck N thereof, adjacent finish F so that they generally depend from the mechanism 17 for dipping into the bath of coating material M. The mechanisms 17 hold the bottles B in upright, stable suspension, and do not rotate the bottles B about their central axes.

Figure 2:
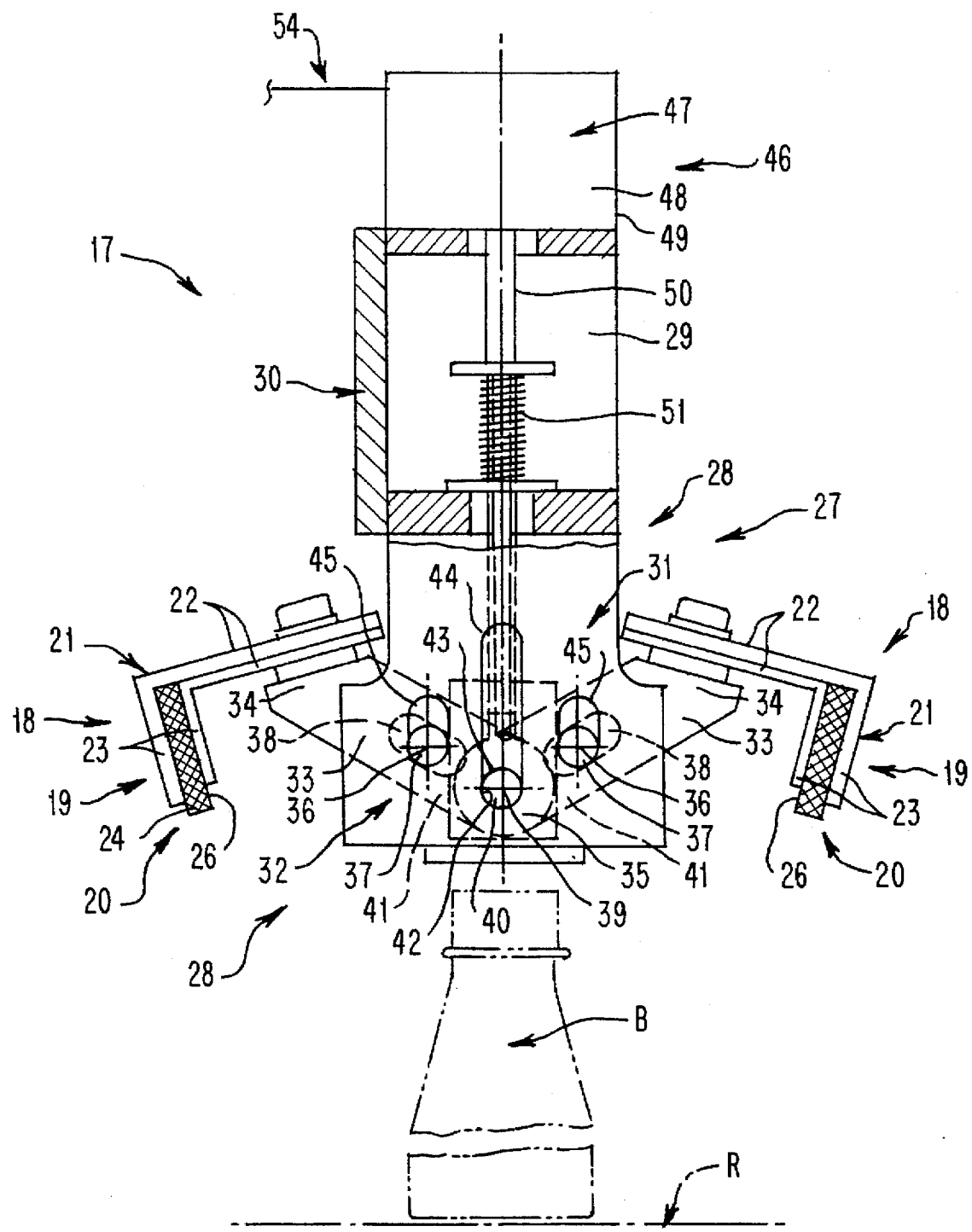
FIG. 2 is a detailed end view of a gripper mechanism of a gripper apparatus showing gripping members in their released position.

One gripper mechanism 17 is shown in more detail in FIGS. 2 to 4, and includes a pair of elongate gripping members 18 arranged parallel with one another, across the lehr conveyor R and along a respective row of bottles B. These gripping members 18 are relatively movable toward and away from one another (as shown by the FIG. 2 to 4 drawings and as will be explained in detail hereinafter) in order to respectively grip and release the row of bottles B.

Each gripping member 18 includes an elongate support body 19, and an elongate gripping element 20 mounted on the support body, and by which the bottles B are engaged for gripping. Each support body 19 is of a sturdy, rigid construction to minimise gripping member distortion and thus possible container grip release, and in this embodiment, those bodies 19 are composed of metal such as steel or aluminium.

Each support body 19 comprises a pair of support elements 21, between which the gripping element 20 is clamped or otherwise rigidly held. The support elements 21 can be loosened or separated so as to enable replacement of the gripping element 20 as necessary. In this embodiment, each support body 19 is of a generally L-shaped configuration, providing a connecting leg 22, and a mounting leg 23 to which the gripping element 20 is connected. The support bodies 19 of each gripping member pair are arranged in mirror image to one another in this embodiment. Moreover, the support elements 21 may be L-shaped so that the elements 21 of each pair fit one inside the other with the gripping element 20 clamped between the overlying mounting legs 23.

Each gripping element 20 is of at least slightly flexible or resiliently deformable composition, to enable cushioned bottle engagement and thereby minimise bottle damage upon or during gripping. In this embodiment, each gripping element 20 is strip-like and has a leading edge region 24 extending therealong and which engages upon bottle neck N. The edge regions 24 project from respective support bodies 19 toward one another so that the bottles are gripped between the edge regions 24 clear of the support bodies 19.

In one embodiment (as shown in FIGS. 2 to 4, the gripping element edge regions 24 are planar or uncontoured, so that an even space 25 is maintained along the length of each pair. In this way, the edge regions 24 simply tangentially engage the bottle necks N. In an alternative embodiment (not shown), those edge regions 24 are contoured so as to neatly fit at least partly about the bottle necks N. In this embodiment, the gripping elements 20 may be interchangeable to accommodate different bottles or other containers.

The gripping elements 20 project clear of their support bodies 19 a sufficient distance to provide support shoulders 6 at the edge regions 24. In this way, bottle finishes F can bear on those shoulders 26, (as shown in FIG. 3 and 4) so that they are more positively held by the gripper mechanism 17.

The gripper mechanism 17 also includes actuating means 27 for controlling relative movement of the gripping members 18 and thus gripping and release of the bottles B. The actuating means 27 is configured and arranged so as to arcuately move the gripping members 18 toward and away from one another for bottle grip and release. Thus, in use in gripping bottles B moving on a lehr conveyor R, the gripping members 18 are moved from a released position as shown in FIG. 2 in a downward, arcuate direction to a gripping position as shown in FIG. 3 on opposite sides of the bottles B, gripping the bottle necks N therebetween. Upon release, to place gripped bottles on the moving lehr conveyor R, those gripping members 18 move in a reverse upward, arcuate direction away from the bottles B to return to the released position shown in FIG. 2.

The actuating means 27 is also configured and arranged so that at least substantially following movement of the gripping members 18 to grip the bottles B, the gripping members 18 move in an upward direction to a gripped position as shown in FIG. 4. This movement is intended to lift the depending bottles B clear of the lehr conveyor R as shown in FIG. 4. Similarly, at least substantially before movement of the gripping members 18 to release the bottles B, the actuating means 27 moves the gripping members 18 and gripped bottles B in a downward direction so as to lower the bottles B onto the conveyor R as shown in FIG. 3. This lifting and lowering of the bottles B enables them to be clearly and positively removed from, and placed on, the lehr conveyor R. In particular, dragging movement between the bottles B and moving conveyor R can be avoided or minimised, thereby reducing the likelihood of bottle fall or damage.

The actuating means 27 includes a series of actuating devices 28 (only one of which is shown in FIGS. 2 to 4) arranged in spaced relation along the gripping members 18, and actuable synchronously to move the gripping members 18. In the exemplary application of the gripper mechanism 17 with 48 wide bottle rows, a total of about 6 actuating devices 28 may be provided along gripping members having a length sufficient to accommodate such bottle numbers. In any event, sufficient actuating device numbers should be provided to enable firm gripping of the required bottle numbers, and to avoid distortion or flexing of the gripping members 18 which could lead to bottle drop or release.

Each actuating device 28 is actuable to move each gripping member 18 through an arcuate distance of about 90° shown when comparing FIGS. 2 and 3. Thus, the gripping members 18 of each pair move apart about 180°. This provides a wide and clear spacing between the gripping members 18 into which the bottle necks N can be received, and from which they can be removed, without interference from the gripping members 18. In this embodiment, the gripping elements 20, or at least their edge regions 24, extend in a generally common horizontal plane when they are moved toward one another into the gripping and gripped positions, and extend in generally parallel vertical planes when moved apart into the released position.

Each actuating device 28, as shown in FIGS. 2 to 4 includes a device body 29 by which the device 28 is mounted to the conveying member 11. That mounting may be direct, although in this embodiment, mounting is through a rigid support structure in the form of a common elongate, rigid mounting bar or other member 30. That member 30 extends transversely of the direction of movement of the conveying member 11 along its conveying path 13, so that actuating devices 28 can be bolted or otherwise mounted in spaced relation therealong, with the gripping members 18 arranged parallel to the transverse rows of bottles B.

Each device body 29 is of a sturdy, rigid construction. Those bodies 29 are composed of metal, such as steel or aluminium, and may be cast or fabricated.

Each actuating device 28 also includes a mounting means 31 though which the gripping members 18 are mounted to the device body 29 for their arcuate movement. Thus, the mounting means 31 enables the gripping members 18 to move in their arcuate directions relative to the fixed device body 29.

Each mounting means 31 includes a mounting linkage 32 located generally between the spaced apart gripping members 18. Each linkage 32 has a pair of mounting links 33, connected one each to a respective gripping member 18, the mounting links 33 also being connected to the device body 29 for movement relative thereto so that movement of the links 33 causes movement of the respective gripping members 18. The mounting links 33 are also interconnected, so that they move together to achieve synchronous movement of the gripping members 18.

Each mounting link 33 is rigidly connected to a respective gripping member 18, and pivotably connected to the device body 29, pivotal movement of the link 33 causing arcuate movement of the gripping member 18. In this embodiment, each link 33 has opposed end regions 34,35, one end region 34 being connected to a respective gripping member 18, and the link 33 being pivotably connected to the device body 29 in spaced relation from that end portion 34. That pivotal connection is intermediate the end regions 34,35, and permits pivotal movement of the links 33 about parallel, spaced separate pivot axes 36 extending parallel to the elongate gripping members 18.

Each mounting linkage 32 includes pivot shafts 37 carried by the device body 29 and on which the mounting links 33 are mounted for pivotal movement about the pivot axes 36. The links 33 are provided with holes 38 through which the shafts 37 extend.

The mounting links 33 have their other end region 35 pivotably interconnected, so that they pivot together about a common pivot axis 39. That pivot axis 39 extends parallel to the separate pivot axes 36, and is located generally centrally between those separate pivot axes 36.

In order that those links 33 can pivot while being interconnected as well as pivotably connected to the device body 29, the holes 38 are enlarged so that the pivot shafts 37 are loosely received. This loose fitting enables a "lost motion" movement between the links 33 and their shafts 37 during pivotal movement about those shafts 37 and at their common pivot axis 39, as shown when comparing FIGS. 3 and 4. The enlarged holes 38 are slot-like, each having their major axis extending in a plane containing the separate and common pivot axes 36,39.

Each mounting linkage 33 also includes a pivot shaft 40 on which the other end regions 35 of the mounting link pair are journalled. Those other end regions 35 are bifurcated, providing pairs of spaced end lug portions 41, the lug portions 41 of each mounting link pair overlapping one another and having holes 42 therethrough for receiving the pivot shaft 40.

The mounting links 33 are constrained against random movement arising from their loose fitting on the pivot shafts 37, and which would cause the gripping members 18 to move from side to side relative to the device body 29. In this embodiment, the pivot shaft 40 providing the common pivot axis 39 is constrained to move along a central plane between the separate pivot axes 36 during mounting link pivoting, and thereby prevent that random movement of the mounting links 33. That plane extends parallel with the pivot axes 36,39 and also perpendicular to a plane containing the separate pivot axes 36.

Constraint of the pivot shaft 40 is achieved by mounting at least one end region 43 of the shaft 40 in a guide slot 44 provided in the device body 29. The guide slot 44 has a major axis extending in the central plane. Thus, the shaft end region 43 is constrained to slide along the guide slot 44 during arcuate movement of the mounting links 33. In this embodiment, both end regions 43 are slidably received in separate guide slots 44.

Upward and downward movement of the gripping members 18, causing lifting and lower of gripped bottles B from and onto the lehr conveyor R respectively, is achieved through appropriate linear movement of the mounting links 33. Thus, the links 33 undergo a linear upward movement, as shown in FIG. 4 relative to the device body 29 to lift the gripping members 18 and a linear downward movement to lower those members 18 as shown in FIG. 3.

That mounting link movement is achieved by mounting the separate pivot shafts 37 so as to allow them to undergo linear movement relative to the device body 29. Opposite end regions of those shafts 37 are carried in mounting slots 45 in the device body 29. Those slots 45 have their major axes extending in the direction of desired mounting link 33, and thus gripping member 18, linear movement. The lengths of the mounting slots 45 may be selected to accord with the desired or required extend of gripping member movement.

The gripper apparatus 16 (FIG. 1) further includes drive means 46 operable (FIG. 2 to 4) to actuate the actuating devices 28 and thereby move the gripping members 18 for gripping and releasing bottles B. Specifically, the drive means 46 is connected to the mounting linkage 32 to move that linkage 32 and thereby arcuately and linearly move the gripping members 18.

One embodiment of the drive means 46 is shown in FIGS. 2 and 4, and includes a respective drive motor 47 associated with each mounting linkage 32. Those motors 47 are operated by pressurised working fluid, and are connected to the mounting linkage 32 so as to provide an output force to the links 33 at their pivotably interconnected end regions 35, that force causing link movement in at least one arcuate and linear direction.

In this embodiment, each drive motor 47 is a linear output piston and cylinder actuator 48, having a cylinder 49 mounted on the device body 29 and a piston (not shown) in the cylinder 49 with a connecting piston rod 50 projecting from the cylinder 49 and connected directly or indirectly to the common pivot shaft 40. The actuators 48 are operable to drive the pivot shaft 40 in a (downward) direction causing downward linear movement, followed by upward arcuate movement, of the mounting links 33 and gripping members 18. This operation moves the gripping members 18 to their released position (as shown in FIG. 2).

In one embodiment (not shown), the actuators 48 are also operable to drive the pivot shaft 40 in the opposite (upward) direction causing downward arcuate movement, followed by upward linear movement, of the mounting links, in order to move the gripping members 18 to their gripped positions. Thus, in this embodiment, the actuators 48 are double acting.

However, in an alternative embodiment (as shown FIGS. 2 to 4), the drive means 46 includes a separate resilient biasing member 51 urging the pivot shaft 40 in that opposite direction. That biasing member 51 is a biasing spring acting between the device body 29 and connecting rod 50. Thus, in this alternative embodiment, the biasing member 51 urges the gripping members 18 into their gripped position (as shown in FIG. 4), that bias being overcome to move the gripping members 18 into their release position, by operation of a single acting actuator 48.

In this embodiment, each drive motor 47 operates pneumatically or hydraulically with pressurised working fluid supplied from a suitable pressurised fluid source (not shown). That supply to and from the drive motors 47 is controlled by an operating system 52 included in the drive means 46.

Figure 5:
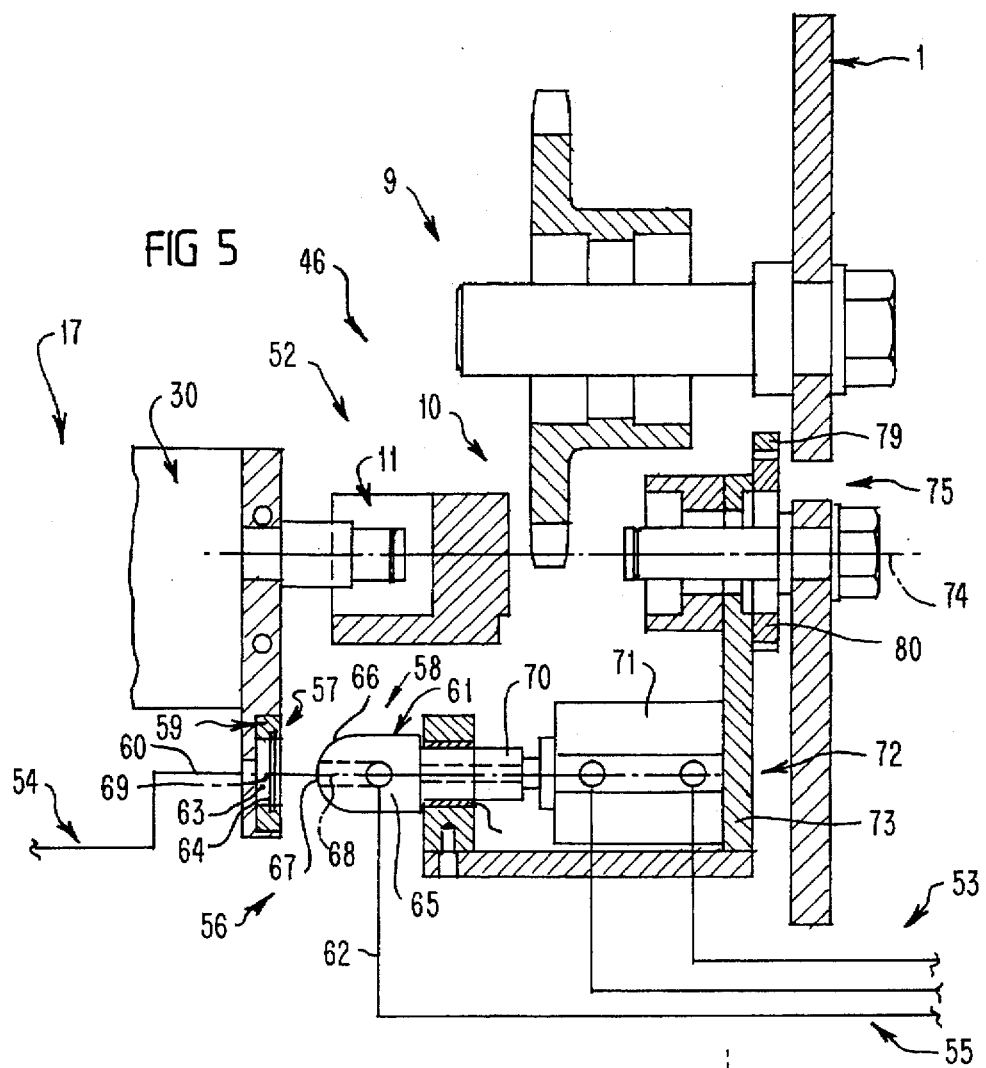
FIG. 5 is a detailed cross-sectional end view of part of the gripper apparatus showing part of a drive means for the gripping members.
Figure 6:
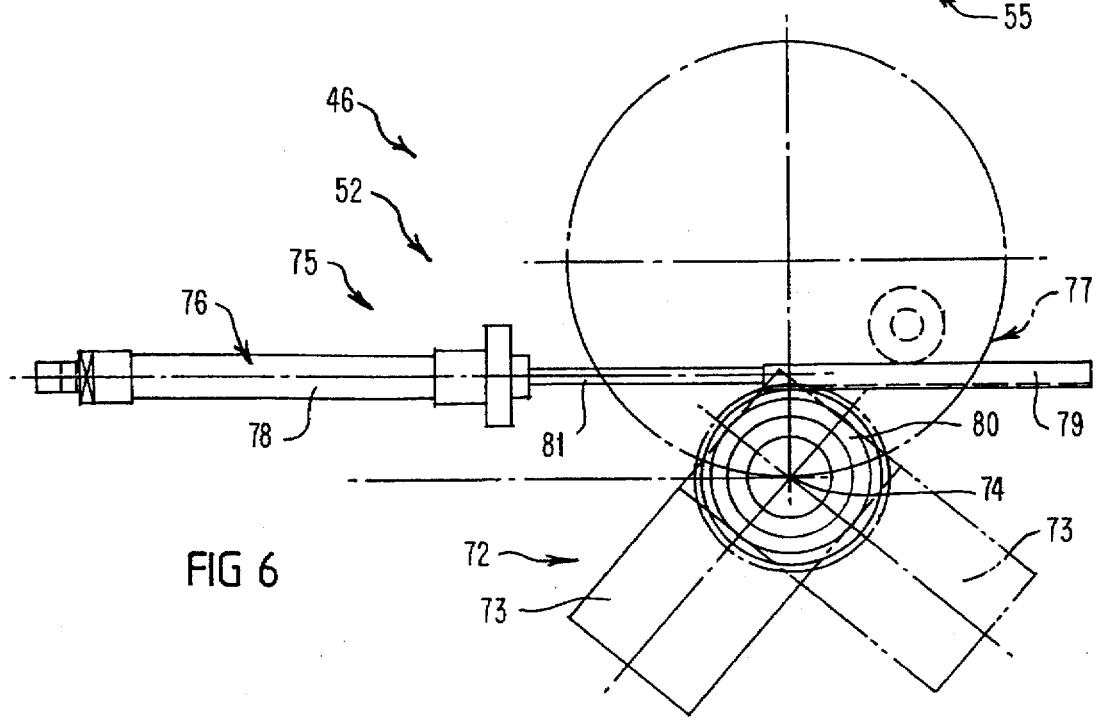
FIG. 6 is a detailed side view of part of the drive means of FIG. 5.

The operating system 52 of this drive means embodiment is shown in detail in FIGS. 5 and 6, and includes a working fluid operating circuit 53 for at least providing working fluid from the source to the drive motors 47 (FIGS. 2 to 4). That circuit 53 includes a demand circuit branch 54 (FIGS. 2 to 5) carried with a gripper mechanism 17 on the moving conveying member 11, and connecting with each of the drive motors 47 (FIGS. 2 to 4). The circuit 53 further includes a supply circuit branch 55 (FIG. 5) located adjacent the conveying path 13 and extending to the supply source.

The operating system 52 shown in FIGS. 5 and 6 further includes branch coupling means 56 for selectively coupling together the supply and demand circuit branches 55,54 to enable working fluid flow therebetween. That coupling means 56 is arranged so as to selectively couple the branches 54,55 together only for the duration that working fluid is required to be transferred between them, the coupling means 56 otherwise uncoupling the branches 54,55 so that the gripper mechanism 17, and the associated demand circuit branch 54, can move with the conveying member 11 along the conveying path 13 (shown in FIG. 1) free of circuit coupling to a remote supply source. In addition, where a plurality of gripper mechanisms 17 (FIG. 1) are mounted on the conveying member 11, the operating system 52 can provide separate demand circuit branches 54 for each gripper mechanism 17, and a common supply circuit branch 55 with a coupling means 56 for coupling together the supply circuit branch 55 with demand circuit branches 54 on each gripper mechanism 17 in turn.

The coupling means 56 includes at least one coupling member 57,58 connected to each of the circuit branches 54,55, a coupling member 58 of the supply circuit branch 55 interconnecting with a coupling member 57 of the demand circuit branch 54 to achieve branch coupling. In the exemplary application of the gripper apparatus 16, a single coupling member 57 is connected to each demand circuit branch 54, whilst a pair of coupling members 58 are connected to the supply circuit branch 55. Those supply circuit branch coupling members 58 are arranged in spaced relation along the lehr conveyor R at the entry and exit zones 3,4 (shown in FIG. 1), for connection to demand circuit branches 54 at those zones 3,4 in order to operate the gripper mechanism drive motors 47 to achieve bottle gripping and release, respectively.

Each demand circuit branch coupling member 57 is one of a male or female coupling member whilst each supply circuit branch coupling member 58 is the other of a male or female coupling member, those coupling members 57,58 interconnecting to achieve coupling. In this embodiment, the female coupling members 57 are connected to the demand circuit branch 54 and the male coupling members 58 are connected to the supply circuit branches 55.

Each female coupling member 57 includes a coupling socket 59 communicating with a flow line 60 of the demand circuit branch 54, whilst each male coupling member 58 includes a coupling plug 61 communicating with a flow line 62 of the supply circuit branch 55. The plug 61 is receivable in, and sealingly engageable with, the socket 59 so as to interconnect the flow lines 60,62 and enable working fluid flow therebetween.

Each coupling socket 59 has a receiving recess 63 with an opening for the coupling plug 61. The recess 63 is circular shaped in this embodiment, but may be alternate shapes in other embodiments. The flow line 60 connects into the receiving recess 63.

Each coupling socket 59 also includes a sealing element 64 positioned within the recess 63 and with which the coupling plug 61 engages for fluid sealing. The sealing element 64 is a sealing ring, composed of suitable flexible or resilient material, in this embodiment.

Each coupling plug 61 includes a plug nipple 65 for projecting into the receiving recess 63. The nipple 65 has a rounded leading end region 66 for extending into the receiving recess 63, with a smooth outer surface for engaging upon the sealing element 64. The nipple 65 has a fluid flow bore 67 therethrough opening onto the leading end region 66 for communication with the receiving recess 63, the flow line 62 connecting into that flow bore 67.

The interconnectable coupling members 57,58 are relatively movable to achieve actual connection and disconnection. In this embodiment, the male coupling members 58 are so movable. To that end, each coupling plug 61 is mounted for reciprocal linear movement to project into the coupling socket 59 for connection (not shown) and retraction from the coupling socket 59 for disconnection (as shown in FIG. 5). That movement is along a connection axis 68, and occurs when that axis 68 aligns with a connection axis 69 of a coupling socket 59. Each male coupling member 58 includes a support shaft 70 on which a respective coupling plug 61 is carried, the shaft 70 being mounted for sliding movement along the connection axis 68.

The drive means 46 further includes a drive motor 71 operable for slide moving the support shaft 70 to achieve coupling plug connection and disconnection with the coupling sockets 59. That motor 71 is a piston and cylinder actuator in this embodiment. The actuator is double acting, to positively drive the support shaft 70 in both directions achieving connection and disconnection between the coupling plugs 61 and sockets 59. The actuator may be single acting, spring return in an alternative embodiment. In this embodiment, each drive motor 71 is operated, pneumatically or hydraulically, with pressurised working fluid supplied from a suitable pressurised fluid source.

During operation of the exemplary coating apparatus 1 incorporating the present invention, the gripper mechanisms 17 (FIG. 1) will be moving with the conveying member 11 while gripping and releasing bottles B. Accordingly, the circuit branches 54,55 will be coupled together while the gripper mechanisms 17 are moving. In order to accommodate the resulting relative movement between those circuit branches 54,55 during coupling, the coupling members 57,58 are mounted for unitary movement while interconnected. In particular, at least one of the coupling members 57,58 being interconnected is selectively movable relative to its associated circuit branch 54,55.

In this embodiment, the coupling members 58 are movable, and the drive means 46 further includes a mounting member 72, shown in FIGS. 5 and 6, on which the coupling plug 61 is carried. The mounting member 72 also carries the support shaft 70 for the coupling plug 61, as well as the associated drive motor 71. That mounting member 72 is mounted adjacent the conveying member 11, in the entry and exit zones 3,4, for movement that enables the coupling plug 61 to remain connected with a coupling socket 59 during socket movement for that period required to achieve bottle gripping or release by the gripper mechanism 17. That mounting is such that the manner of mounting member movement accords with the manner of movement of the coupling socket 59.

In the exemplary application, each coupling socket 59 undergoes an arcuate movement during that period of gripper mechanism gripping and release of bottle rows. Accordingly, each mounting member 72 is mounted for pivotal movement so that the carried coupling plug 61 can undergo that same parallel, arcuate movement. Arcuate movement of the mounting member 72 is reversible between a connection position (as shown in full line in FIG. 6), at which a carried coupling plug 61 can connect with a coupling socket 59, and a disconnection position (as shown in broken line in FIG. 6) at which disconnection between the plug 61 and socket 59 occurs.

Each mounting member 72 is a mounting bracket 73 mounted on the coating apparatus 1 for pivotal movement on a pivot axis 74 extending parallel to the connection axes 68,69.

Movement of each mounting member 72 from the connection position to the disconnection position is achieved through interconnection of the coupling plugs 61 and sockets 59 combined with gripper mechanism movement. However, reverse movement of the mounting members 72, and thus coupling plug 61, is provided by a respective drive device 75 in one embodiment. Each coupling plug 61 connects with successive coupling sockets 59 when the respective mounting member 72 is at the connection position, the interconnected coupling plug 61 and socket 59 travelling in unison until the mounting member 72 reaches the disconnection position (as shown in broken line FIG. 6) whereupon the plug 61 is disconnected from the socket 59. Thereafter, the drive device 75 reverse moves the mounting member 72 back to the connection position (as shown in full line in FIG. 6) for connection of the carried coupling plug 61 with a following gripper mechanism coupling socket 59.

Each drive device 75 includes a drive motor 76 providing a linear output, and a drive transmission 77 for converting that linear output to a rotary input to each mounting member 72. In this embodiment, each drive motor 76 is a piston and cylinder actuator 78, whilst each drive transmission 77 is a rack 79 and pinion 80 for linear movement thereof. The rack 79 is fixed to the piston rod 81 of the actuator 78. The pinion 80 is fixed to a respective mounting bracket 73, coaxial with its pivot axis 74, and engaged with the rack 79 so that linear movement of the rack 79 causes rotary movement of the pinion 80 and, with it, the mounting bracket 73.

Each mounting bracket actuator 78 is single acting to move the mounting bracket 73 from the disconnection position to the connection position, with an idle return under influence of the unitary movement of the interconnected coupling plugs 61 and sockets 59. Each of these drive motors 76 operates, pneumatically or hydraulically, with pressurised working fluid supplied from a suitable pressurised fluid source.

To further accommodate the unitary arcuate movement of the interconnected coupling members 57,58, at least one of those members is also mounted for rotary movement about their respective connection axis 68,69. That rotary movement allows the connected coupling plugs 61 and sockets 59 to remain relatively fixed during connection rather than having the plugs 61 turning within the sockets 59, which may lead to plug and socket wear.

In this embodiment, the male coupling members 58 are so movable. To that end, each coupling plug 61 is mounted for rotary movement about its connection axis 68. That is achieved, by rotatably mounting each plug 61 on its associated support shaft 70. The support shaft 70 is journalled in the coupling plug 61 and may be mounted through suitable bearings 82.

The operating system 52 further includes control means (not shown) for controlling operation of the drive motors, and in particular supply of working fluid to and from the actuators 71,76 moving the coupling plugs 61 for connection to and disconnection from the coupling sockets. In the exemplary application, the control means is intended to synchronise plug and socket connection and disconnection with conveying member movement, as well as with bottle movement on the lehr conveyor R to ensure orderly gripping and release of the bottles B.

The control means is of any suitable configuration and construction well known to those skilled in the relevant art. However, in one embodiment, the control means includes a computer control unit connected to appropriate sensors and/or detectors monitoring the location of the gripper mechanisms 17 and bottle rows so as to coordinate gripper mechanism speed with the rate of bottle row movement, and consequentially issue commands ensuring coupling plug and socket connection and disconnection for operation of the gripper mechanisms 17 to grip bottle rows in the entry zone and release those bottles in the exit zone. The control means may also include a sensor to detect bottle rows unsuitable for pick up, such as rows having misaligned containers, so that the computer control unit can issue commands that avoids their pick up with the gripper mechanisms 17.

In order to further understand the present invention, operation of a coating apparatus 1 incorporating gripper apparatus 16 according to the above described preferred embodiment will now be outlined.

As disclosed in the above mentioned patent and patent application, the coating apparatus 1 is installed in a bottle manufacturing line above a lehr conveyor R so that the bottles are taken in successive rows from the conveyor at an entry zone 3, coated and subsequently replaced on the conveyor R at an exit zone 4, as shown in FIG. 1.

As each gripper mechanism 17 approaches the entry zone 3, the drive motor 76 (FIG. 6) for pivoting the mounting bracket 73 of the male coupling member 57 mounted at that zone 3 is operated to move the bracket 73 into the connection position (full line in FIG. 6). In addition, the drive motor 71 for the coupling plug 61 is operated to retract that plug 61 (FIG. 6).

Upon alignment of the connection axes 68,69 of the coupling plug 61 and coupling socket 59, the coupling plug 61 is driven to project into the coupling socket 59 for connection therebetween (FIG. 5). Contemporaneously the mounting bracket 73 is released to allow unitary arcuate movement of the interconnected coupling plug 61 and socket 59.

The gripping members 18 (FIG. 2 to 10) of each approaching gripper mechanism 17 are initially in their gripped position (FIG. 4). However, as the plug 61 and socket 59 interconnect, working fluid is supplied from the supply circuit branch 55 to the demand circuit branch 54 in order to operate the drive motors 47. Fluid flow from the coupling plug 61 may occur or commence prior to connection with the coupling socket 59 so as to achieve immediate drive motor operation upon interconnection. That drive motor operation causes the gripping members 18 to move to their released position (FIG. 2). The gripping members 18 are thus ready to grip a row of bottles B simultaneously arriving at the entry zone 3.

As the gripper mechanism 17 (FIGS. 2 to 4) moves over the row of bottles B, the gripping members are held clear of the bottle necks N so as to not cause interference with the bottles B as they approach alignment.

As the gripper mechanism 17 reaches a position over the row of bottles B (FIG. 2), fluid flow to the demand circuit branch 54 ceases, causing operation of the gripper mechanism drive motors 47. That drive motor operation involves exhausting the working fluid from the demand circuit branch 54. That exhaust can occur back through the interconnected coupling plug 61 and socket 59. In any event, fluid flow to those drive motors 47 is ceased prior to disconnection of the coupling plug 61 and socket 59 in order to minimise jerking or other erratic movement of the gripper mechanism 17 that might be caused by simulataneous ceasing of the fluid flow, and plug and socket disconnection. As a result of that drive motor operation, the gripping members 18 move to their gripping position (FIG. 3) gripping the bottle row, and then lifting the bottles B from the lehr conveyor R into the gripped position (FIG. 4).

Shortly thereafter, the mounting bracket 73 reaches the disconnection position (broken line in FIG. 6), and the drive motor 71 for the coupling plug 61 is again operated to retract the plug 61 and disconnect it from the coupling socket 59 (FIG. 5). At that stage, the mounting bracket 73 is free to fall return back toward its connection position (full line in FIG. 6), that return being positively completed with assistance from its associated drive motor 76 before a following gripper mechanism 17 reaches the entry zone 3.

The gripped bottles B proceed with the gripper mechanism 10 17 along the conveying path 13 until they approach the exit zone 4 (FIG. 1). In that zone 4, the above coupling connection and gripper mechanism operation procedure is repeated with a separate male coupling member 58, with the result that the gripped bottles B are released and returned to the lehr conveyor R.

This procedure is repeated with each gripper mechanism 17 in succession.

Referring now to FIGS. 7 to 13, there is shown a modified drive means 46a operable to actuate the actuating devices 28 (shown in FIG. 8), and fin particular to drive the pivot shaft 40 in alternate directions to move the gripping members 18 between their bottle gripped and released positions.

This drive means 46a includes separate connecting rods 83 (as shown in FIGS. 7, 9, 10 and 12, each connected to a respective common pivot shaft 40 so as to be movable in the same manner as connecting rods 50 provided by actuators 48 of the drive means 46 of the previous embodiment.

The drive means 46a also includes an elongated drive member 84 (as shown in FIGS. 7, 9, 10 and 12) mounted on the gripper mechanism 17 so as to extend therealong, parallel with the gripping members 18. The drive member 84 is mounted for longitudinal linear sliding movement, movement in alternate linear directions moving the connecting rods 83 to positions toward and away from the lehr conveyor R so as to move the gripping members 18. In this embodiment, the drive member 84 includes a drive rod 85. That drive rod includes a driving end region 86 through which the rod 85 is driven, as will become more apparent hereinafter.

The drive means 46a also includes connection means 87, interconnecting the drive member 84 with each of the respective connecting rods 83 so as to transmit driving forces therebetween. The connection means 87 includes a series of cam members 88 mounted on the drive member 84 for linear movement therewith. Respective cam members 88 are arranged adjacent respective connecting rods 83. A series of cam follower members 89 are mounted on each of the connecting rods 83, remote from the common pivot shafts 40, and they cooperate with the adjacent cam members 88 in such a way that linear longitudinal movement of the drive member 84 translates into perpendicular, linear longitudinal movement of each of the connecting rods 83.

In this embodiment, each of the cam members 88 includes a cam plate 90 mounted on the drive rod 85. Each plate 90 contains an elongate cam slot 91 having an angled rise and return section 92 and a level dwell section 93. In this embodiment, each of the follower members 89 includes a follower pin 94 received in the respective cam slot 91 and constrained to move therealong in response to linear movement of the cam plate 90.

Figure 7:
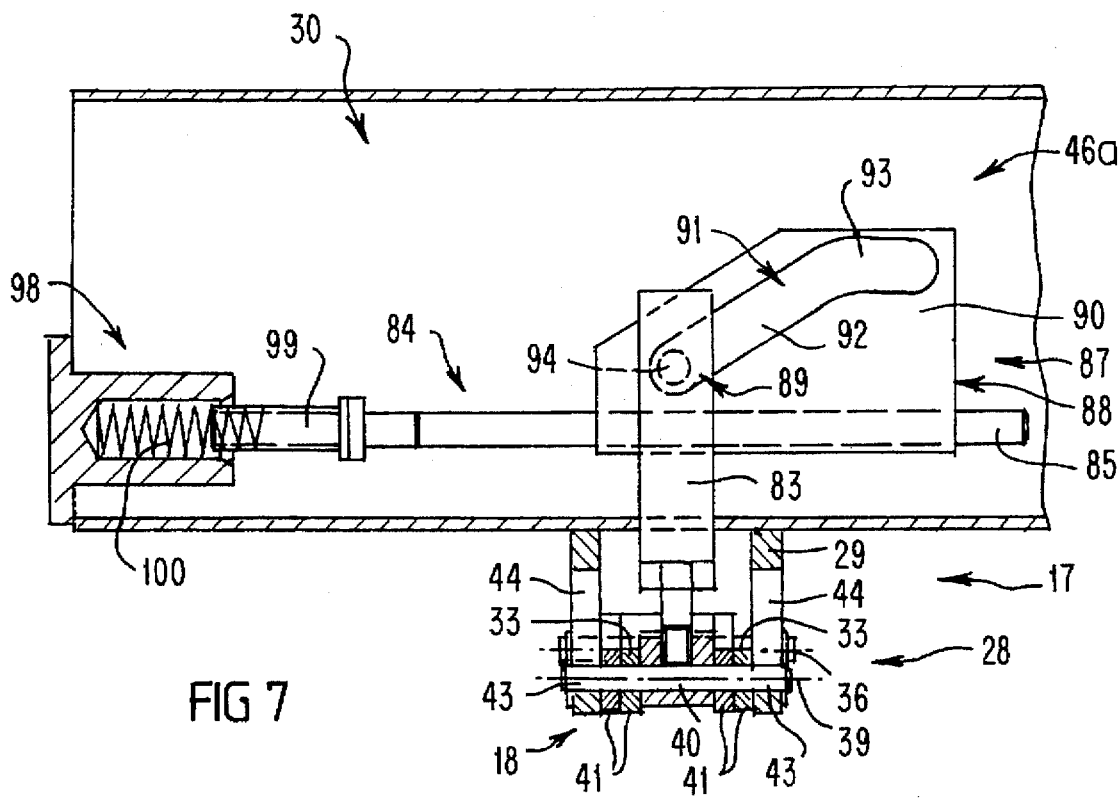
FIG. 7 is a detailed cross-sectional side view of a gripper mechanism according to a preferred embodiment of the present invention, and showing the gripping members in their released position and drive means for the gripping members.
Figure 8:
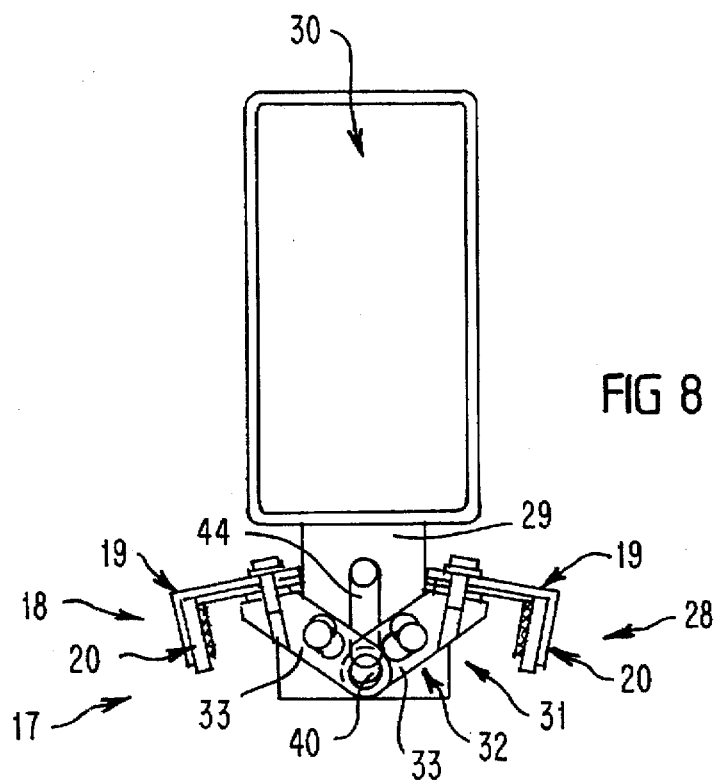
FIG. 8 is an end view of the gripper mechanism of FIG. 7.
Figure 10:
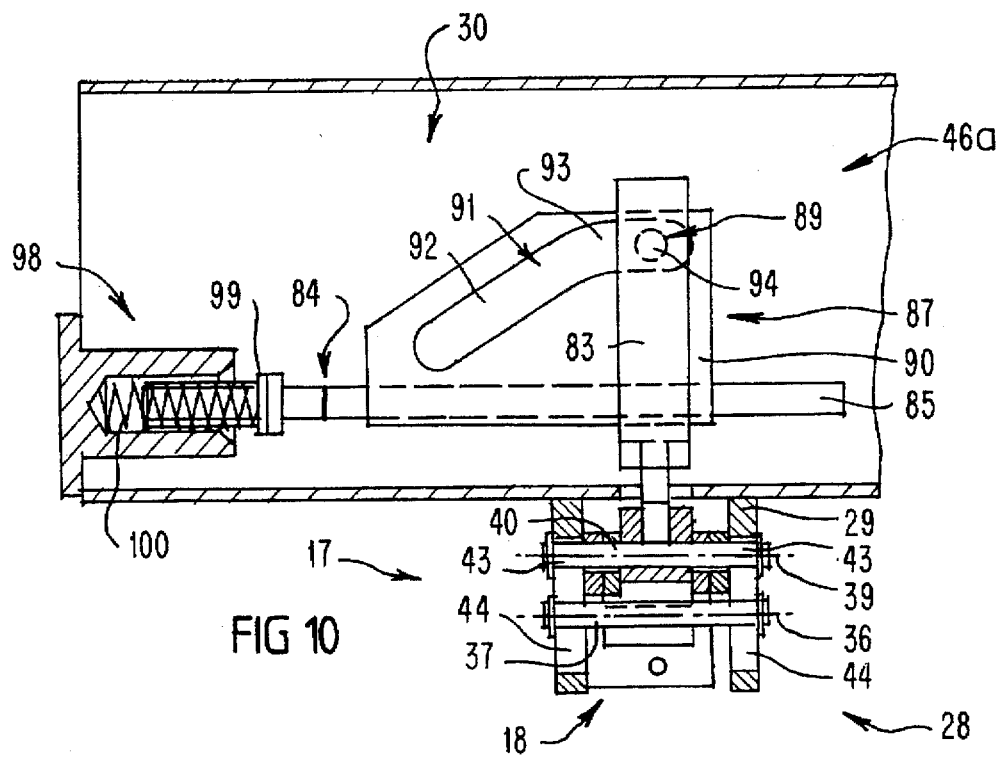
FIG. 10 is a similar view as FIG. 7 of the gripper mechanism but showing the gripping members in their gripped positions.
Figure 11:
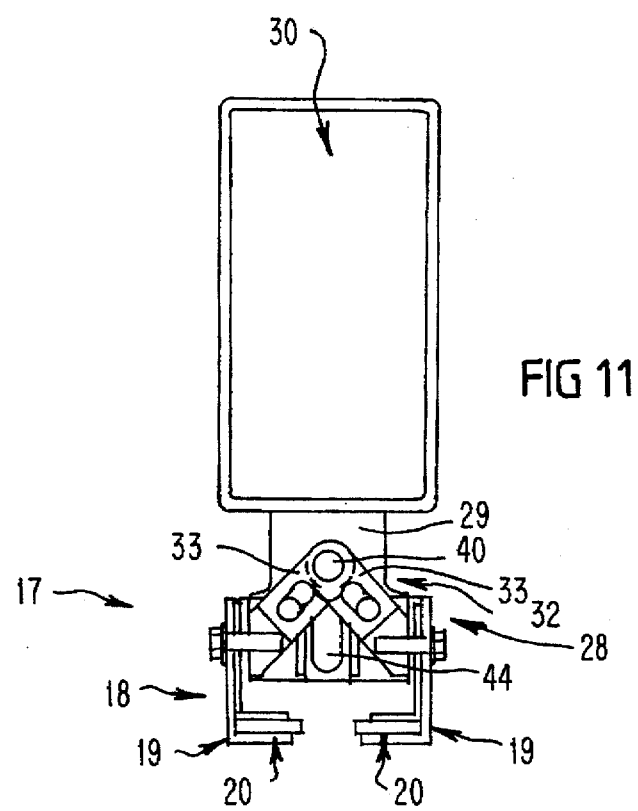
FIG. 11 is an end view of the gripper mechanism of FIG. 10.

In this embodiment, when the follower pins 90 are located at the lower end of the rise and return section 92 (as shown in FIG. 7) of the cam slot 91, the gripping members 18 are in their released position (as shown in FIG. 8). Linear movement of the drive rod 85 in one direction as shown by the arrow F, moves the cam plates 90 therewith, causing the follower pins 94 to ride up along the rise and return section 92 (as shown in FIG. 10). That in turn moves the connecting rods 83 toward the lehr conveyor R, thereby moving the gripping members 18 into their gripping position (as shown in FIG. 11). As the follower pins 94 ride into the dwell section 93 (as shown in FIG. 10) of the cam slots 91, the gripping members 18 reach the gripped position. The dwell sections 93 retain the pins against a tendancy to return ride down the rise and return section 92 under gravity influence. As a result, the gripping members 18 are maintained in their gripped position, until the drive rod 85 is moved in a reverse direction.

Figure 9:
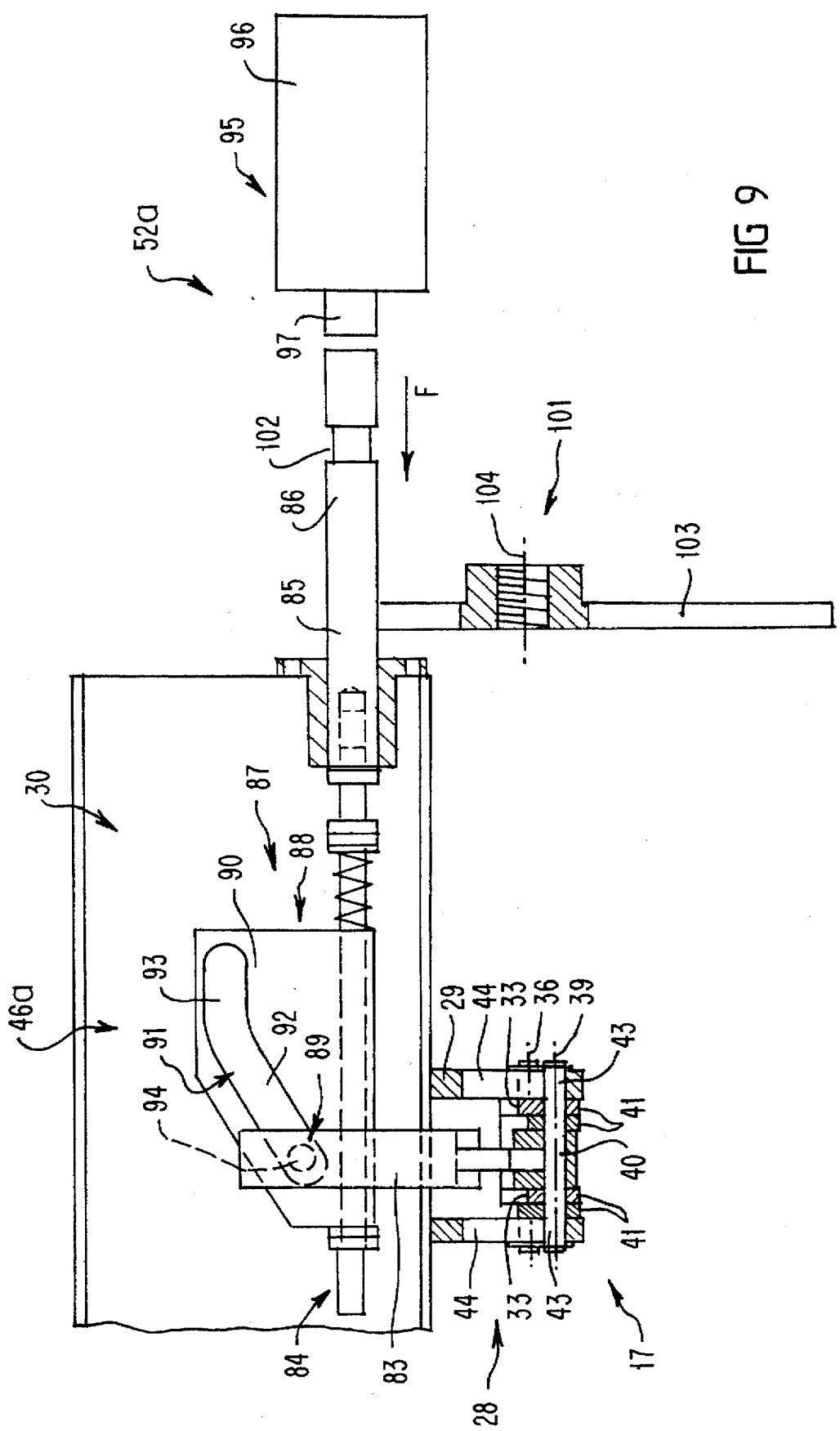
FIG. 9 is a detailed cross-sectional side view of the gripper mechanism showing another part of the drive means of FIG. 7, and showing the gripping members in their released position.

The modified drive means 46a also includes a modified operating system 52a (as shown in FIGS. 9 and 12) to provide working forces to the drive member 84 in order to move it in the alternate directions.

The operating system 52a includes a drive motor 95 selectively engageable with the drive member 94 in order to move the drive member 84 at least in the one direction of arrow F to achieve movement of the gripping members 18 from their released to gripped positions. In this embodiment, the drive motor 95 engages the driving end region 86 of the drive rod 85, and pushes that rod 85 in the respective one direction to achieve that gripping member movement.

In this embodiment, the drive motor 95 includes a piston and cylinder actuator 96, the actuator having a push rod 97 coaxially alignable with the drive rod 85 and engageable therewith to drivingly move the drive rod 85.

The drive motor 95 pushes the drive rod 85 in one direction as shown by the arrow F. To return move that rod 85 in the opposite direction, and thereby move the gripping members 18 from the gripped position to the released position, the operating system 52a also includes a resilient biasing facility 98 (as shown in FIGS. 7 and 10) associated with the drive rod 85. The biasing facility 98 is arranged at an opposite end 99 of the rod 85 to bias it in the opposite direction to arrow F, the actuator 96 acting on the rod at the driving end region 86 to move it in the one direction against that resilient bias. In this embodiment, the biasing facility 98 includes a coil spring 100.

The exemplary coating apparatus incorporating the gripper apparatus 16 with the modified drive means 46a operates generally as described in relation to the previous embodiment. In particular, the gripper mechanism will be moving with the conveying member 11 while gripping and releasing bottles B. To accommodate this movement during driving of each drive rod of successive gripper mechanisms, with the drive motor 95, the drive motor 95 is mounted for unitary movement with the drive rod 85 during driving.

In this embodiment, that unitary movement is achieved in a similar manner as described in the previous embodiment. In this embodiment, the drive motor 95 replaces a respective coupling plug 61 and associated shaft 70 and drive motor 71, carried on the mounting bracket 73, located in the entry zone 3.

Since, in this embodiment, the drive motor 95 operates to move the drive rod 85 in a direction which moves the gripping members 18 to their gripped position, disengagement of the drive motor from the drive rod 85 will tend to cause the gripping members 18 to return to their released position under action of the coil spring 100. To prevent that return movement while the gripper mechanism 17 is transferring a gripped row of bottles B from the entry zone 3 to the exit zone 4, the operating system 52a further includes retaining means 101 (See FIGS. 9, 12 and 13) for temporarily engaging the drive rod 85 to retain that rod 85 in position against premature return movement.

The retaining means 101 includes a retaining recess 102 in each drive rod 85, at the driving end region 86 thereof. Each recess is in the nature of a circumferential groove in the driving end region 86, in this embodiment.

The retaining means 101 also includes a respective retaining lever 103 mounted on each gripper mechanism 17. Each retaining lever 101 is mounted for pivotal movement about pivot axis 104 between a position engaging in the retaining recess 102 (as shown in FIG. 12 and the full line in FIG. 13), and a position disengaging from the recess 102 (as shown in FIG. 9 and the broken line in FIG. 13). The lever 103 is biased, such as by weight of the lever, into the engaging position (FIG. 12). The recess 102 and lever 103 are arranged so that, as the drive rod 85 moves into a position where the gripping members 18 are in their gripped position, the recess 102 aligns with the lever 103. The lever 103 then automatically engages therein to retain the drive rod in position.

The retaining lever 103 is disengaged from the retaining recess 102 at the exit zone 4. That disengagement is achieved through engagement of the lever 103 with a fixed stop member 105 (as shown in FIG. 13). As the lever 103 abuts that stop member 105, it is caused to pivot against the lever bias out of the retaining recess 102, whereupon the biasing spring 100 acts to move the drive rod 85 in the opposite direction. As a result of that drive rod movement, the gripping members 18 move to their released position, so that the transported gripped bottles B are released and returned to the lehr conveyor R.

Again, this procedure is repeated with each gripper mechanism 17 in succession.

The present invention provides an apparatus for reliable and consistent means for gripping of rows of articles, such as glass bottles and similar containers. In the exemplary application, rows of bottles can be picked up and put down consistently and without significant bottle drop or breakage.

Finally, it is to be appreciated that various modifications and/or additions may be made to the gripper apparatus without departing from the ambit of the present invention as defined in the claims appended hereto.

We claim:

1. Gripper apparatus for releasably gripping a row of glass containers moving on a lehr conveyor, the gripper apparatus comprising:

- a rigid support structure adapted to be mounted in container processing apparatus adjacent the lehr conveyor;
- a pair of elongated gripping members arranged parallel with one another and movable toward one another to grip a row of glass containers at an upper region thereof and suspend the glass containers from the gripping members in spaced apart relation therealong, and movable away from one another for releasing the row of suspended containers;
- actuating means connected to the gripping members and actuable to control movement of the gripping members and thus control the gripping and releasing of the containers, the actuating means including a series of actuating devices spaced apart along the gripping members, each actuating device including:

a rigid device body for mounting the respective actuating device to the support structure, and a mounting linkage carried by the device body and connected to the gripping members; and drive means for controlling the actuating devices including:

an elongated drive member mounted to the support structure for longitudinal linear movement;

a series of connecting members each connected to a respective one of the mounting linkages, and pairs of cam and cam follower members spaced apart along the drive member, each cam and cam follower member pair interconnecting the drive member and a respective one of the connecting members, the cam and cam follower members of each pair arranged so that linear movement of the drive member in alternate linear directions operates the pairs of cam and cam follower member to drive the connecting members in a manner causing the mounting linkages to move the gripping members for respective container gripping and releasing.

2. Gripper apparatus for releasably gripping a row of glass containers moving on a lehr conveyor, the gripper apparatus comprising:

a rigid support structure adapted to be mounted in container processing apparatus adjacent the lehr conveyor;

a pair of elongated gripping members arranged parallel with one another and movable toward one another to grip a row of glass containers at an upper region thereof to suspend the glass containers from the griping members in spaced apart relation therealong, and movable away from one another for releasing the row of suspended containers;

actuating means connected to the gripping members and actuable to control movement of the gripping members and thus control the gripping and releasing of the containers, the actuating means including a series of actuating devices spaced apart along the gripping members, each actuating device including:

a rigid device body for mounting the actuating device to the support structure, and a mounting linkage carried by the device body and connected to the gripping members, the mounting linkage being movable to move the gripping members relative to the device body for container gripping and releasing, the mounting linkage also being movable to raise and lower the gripping members relative to the device body for raising the lowering the suspended containers relative to the lehr conveyor; and drive means for controlling the actuating devices, including:

an elongated drive member mounted to the support structure for longitudinal linear movement, a series of connecting members each connected to a respective one of the mounting linkages, and pairs of cam and cam follower members spaced apart along the drive member, each cam member and cam follower member pair interconnecting the drive member and a respective one of the connecting members, the cam and cam follower members of each pair arranged so that initial linear movement of the drive member in a first direction operates the pairs of cam and cam follower member to drive the connecting members in a manner causing the mounting linkages to move the gripping members for gripping the row of containers, and so that further linear movement of the drive member in the first direction raising the gripping members to raise the suspended containers clear of the lehr conveyor.

3. Gripper apparatus as claimed in claim 1, wherein the cam members are rigidly mounted along the drive member for movement therewith, and the cam follower members are mounted on a respective connecting members.

4. Gripper apparatus as claimed in claim 1, wherein the drive member includes a drive rod and each cam member includes a cam plate having an elongate cam slot and each cam follower member includes a follower pin received in the cam slot, movement of the drive rod causing the follower pins to move along the respective cam slots in response to cam plate movement.

5. Gripper apparatus as claimed in claim 1, wherein the drive means includes biasing means for biasing the gripping members into a container release position, the drive means being selectively operable to linearly move the drive member in one linear direction thereby to move the gripping members against the bias of the biasing means into a container gripping position.

6. Gripper apparatus as claimed in claim 5, wherein the drive means further includes a drive motor operable to linearly move the drive member.

7. Gripper apparatus as claimed in claim 6, wherein the drive motor is operable to move the drive member in the one linear direction and the biasing means includes a resilient biasing member acting on the drive member to bias the drive member in an opposite linear direction, the drive motor being selectively operable to move the drive member in the one direction against the resilient bias to move the gripping members into the container gripping position.

8. Gripper apparatus as claimed in claim 6, wherein, in use, the gripping members and drive member move along a container conveying path while the drive motor is substantially stationary relative to the path, and the drive motor is mounted for movement in unison with the drive member while the drive member and drive motor are engaged and as the gripping members move along the conveying path.

9. Gripper apparatus as claimed in claim 8, wherein the drive means further includes a mounting member on which the drive motor is mounted, the mounting member being movable in one direction, being that direction of gripping member movement along the conveying path, during drive member and drive motor engagement, and movable in an opposite direction following drive member and drive motor disengagement.

10. Gripper apparatus as claimed in claim 9, wherein the mounting member and drive motor move in the one direction under influence of the moving drive member with which it is engaged, and the drive means further includes a drive mechanism operable to move the mounting member and disengaged drive motor in the opposite direction.

11. Gripper apparatus as claimed in claim 7, wherein the drive means further includes retaining means for temporarily engaging the drive member following movement in the one direction against the resilient bias in order to positively retain the drive member in its moved position, and thus the actuating devices in their respective positions moving the gripping members, the drive member moving in the opposite direction under action of the biasing means following disengagement of the retaining means.

12. Gripper apparatus as claimed in claim 11, wherein the retaining means includes a retaining recess in the drive member and a retaining lever mounted for pivotal movement to engage in the retaining recess when the drive member is in its moved position, and subsequently disengage from the retaining recess to allow movement of the drive member in the opposite direction under bias of the biasing means.

13. Gripper apparatus as claimed in claim 11, wherein the retaining lever is weight biased into a position so as to engage in the retaining recess when the drive member is in its moved position, the retaining lever engaging with a stop member to move against the weight bias and thereby disengage from the retaining recess.

14. Gripper apparatus as claimed in claim 1, wherein the actuating devices are arranged to move the gripping members in arcuate directions toward and away from one another for container gripping and releasing, each gripping member moving through an arcuate distance of about 90° between container gripping and releasing positions.

15. Gripper apparatus as claimed in claim 1, wherein each mounting linkage has a pair of mounting links, each mounting link has opposed end regions, one end region being rigidly connected to a respective gripping member, and the links being separately pivotably connected to the device body intermediate the end regions thereof and permitting pivotal movement of the links about parallel, spaced apart separate pivot axes thereby causing arcuate movement of the gripping members.

16. Gripper apparatus as claimed in claim 15, wherein each mounting linkage includes separate pivot shafts carried by the device body providing the separate pivot axes, the mounting links being mounted on the respective pivot shafts for pivotal movement to cause arcuate movement of the gripping members.

17. Gripping apparatus as claimed in claim 16, wherein the other end regions of each mounting link pair are pivotably interconnected so as to pivot together about a common pivot axis located generally centrally between the separate pivot axes.

18. Gripper apparatus as claimed in claim 17, wherein the mounting links have enlarged holes into which the pivot shafts are loosely received thereby causing relative sliding movement between the links and shafts during pivotal movement of the mounting links about the shafts and about the common pivot axis.

19. Gripper apparatus as claimed in claim 17, wherein each mounting linkage includes a common pivot shaft on which the other end regions of the mounting links are journalled.

20. Gripper apparatus as claimed in claim 19, wherein each connecting member includes a connecting rod connected to each common pivot shaft and drivable in linear directions toward and away from the lehr conveyor, movement of the connecting rods in a direction toward the lehr conveyor causing downward linear movement, followed by upward arcuate movement, of the mounting links and gripping members to move the gripping members to a container releasing position, and movement in a direction away from the lehr conveyor causing downward arcuate movement, followed by upward linear movement, of the mounting links and gripping members to move the gripping members to a container gripping position.

21. Gripper apparatus as claimed in claim 19, wherein each common pivot shaft is constrained to move along a central plane, extending between and parallel with the individual pivot axes, during mounting link pivoting, thereby to prevent random movement of the mounting links.

22. Gripper apparatus as claimed in claim 21, wherein at least one end region of each common pivot shaft is received in a guide slot provided in the respective device body, the pivot shaft end region(s) being constrained to slide along the guide slot during pivoting movement of the mounting links.

23. Gripper apparatus as claimed in claim 22, wherein the mounting links are linearly movable relative to the device body to allow linear movement of the gripping members toward and away from the lehr conveyor, the drive means being operable immediately following gripping of a row of containers supported on a lehr conveyor to raise the mounting links and gripping members in order to raise the suspended containers clear of the lehr conveyor and, immediately prior to releasing of the gripped containers on to the lehr conveyor, to lower the mounting links and gripping members in order to place the containers on to the conveyor.

24. Gripper apparatus as claimed in claim 23, wherein the separate pivot shafts have opposite end regions received in mounting slots in the device body, the slots having their major axes extending in the direction of mounting link linear movement, thereby enabling linear movement of the mounting links relative to the device body, the slots being of a length equal to the distance of gripping member movement toward and away from the lehr conveyor.

25. Gripper apparatus as claimed in claim 1, wherein each gripping member includes an elongate support body connected to the actuating means, and an elongate gripping element mounted on the support body and by which the row of containers are engaged for gripping.

26. Gripper apparatus as claimed in claim 25, wherein each support body is of generally L-shaped cross sectional configuration providing a connecting leg by which the support body is connected to the actuating means and a mounting leg to which the gripping element is connected, the support body pair being arranged in mirror image, with the mounting legs extending toward one another.

27. Gripper apparatus as claimed in claim 25, wherein each support body includes a pair of spaced apart support elements between which the respective gripping element is rigidly held.

28. Gripper apparatus as claimed in claim 27, wherein each gripping element is a gripping strip clamped between the respective support elements and projecting therefrom toward one another so that containers are gripped therebetween.

29. Gripper apparatus as claimed in claim 28, wherein the gripping elements have edge regions which engage the container upper regions, the edge regions being contoured so as to engagingly fit at least partially about the container upper regions.

30. Gripper apparatus as claimed in claim 25, wherein the gripping elements are composed of resiliently deformable material to cushion container engagement during container gripping.

* * * * *